United States Patent [19]
Rode

[11] 3,765,844
[45] Oct. 16, 1973

[54] PRODUCTION OF URANIUM DIOXIDE

[75] Inventor: James A. Rode, St. Louis, Mo.

[73] Assignee: United Nuclear Corporation, Elmsford, N.Y.

[22] Filed: Oct. 4, 1968

[21] Appl. No.: 765,071

Related U.S. Application Data

[63] Continuation-in-part of Ser. No. 741,923, July 2, 1968, abandoned.

[52] U.S. Cl.................. 423/19, 423/253, 423/258, 423/261
[51] Int. Cl............................................ C01g 43/02
[58] Field of Search...................... 23/326, 346, 352, 23/355; 252/301.1

[56] References Cited
UNITED STATES PATENTS

| | | | |
|---|---|---|---|
| 3,160,471 | 12/1964 | Knudsen et al. | 23/355 |
| 3,168,369 | 2/1965 | Reese et al. | 23/346 |
| 3,179,491 | 4/1965 | Ukaji et al. | 23/355 |
| 3,235,327 | 2/1966 | Blundell et al. | 23/355 |
| 3,260,575 | 7/1966 | Heestand et al. | 23/355 |
| 3,273,974 | 9/1966 | Gabor et al. | 23/352 |

*Primary Examiner*—Carl D. Quarforth
*Assistant Examiner*—F. M. Gittes
*Attorney*—Pennie, Edmonds, Morton, Taylor and Adams

[57] ABSTRACT

Uranium dioxide with low fluoride content and excellent milling characteristics suitable for making ceramic grade $UO_2$ pellets is produced by initially hydrolyzing uranium hexafluoride in a fluidized bed of $UO_2F_2$ particles at a temperature in the range between 500°F. and 900°F. and preferably between 650°F. and 750°F. to produce initially substantially nonhygroscopic free-flowing uranyl fluoride powder having an average particle size of +60 mesh. The uranyl fluoride thus obtained is subjected to at least two separate pyrohydrolysis treatments in fluidized beds with gaseous mixtures of hydrogen and steam to produce uranium dioxide. In the initial pyrolysis treatment, the ratio of hydrogen and steam is adjusted to provide a mixture with a relatively low defluorination potential and the flow rate of the mixture is also regulated to suppress the rate of defluorination. The resident time of the particle in the fluidized bed for the first pyrolysis treatment is sufficiently long so that about 98 percent of the fluoride in the feed is removed. The incompletely defluorinated particles are then further treated in a second fluidized bed with a hydrogen and steam gaseous mixture having a higher ratio of $H_2/H_2O$ which will provide a higher defluorination potential and the gas rate is also preferably increased to reduce the partially defluorinated feed to uranium dioxide with a fluoride content less than about 100 ppm and preferably below 40 ppm.

10 Claims, 1 Drawing Figure

PRODUCTION OF URANIUM DIOXIDE

CROSS-REFERENCE TO RELATED APPLICATION

This is a continuation-in-part application of my copending application Ser. No. 741,923, filed July 2, 1968, now abandoned.

BACKGROUND OF THE INVENTION

1. Field of the Invention

This invention relates to uranium dioxide and, more particularly, to a new process for producing the same.

2. Description of the Prior Art

The Argonne National Laboratory developed a dry process for producing $UO_2$ from $UF_6$ utilizing fluidized beds to convert uranium hexafluoride to uranyl fluoride by hydrolysis and then to transform the latter by pyrohydrolysis to uranium dioxide (AEC Reports ANL-6023 and ANL-6902). In the hydrolysis operation the uranium hexafluoride-steam reaction was carried out continuously at a relatively low temperature, about 400° to 450°F., and uranyl fluoride thus obtained is extremely hygroscopic which tends to deposit on internal surfaces of the reactor. The deposition of uranyl fluoride on the reactor vessel requires periodic shutdown for the removal of the deposits, thus rendering the process not suitable for commercial application.

To correct this problem, a high temperature process in which the hydrolysis reaction is carried out at 932°F. was proposed. At the high temperature, the $UF_6$ conversion product is not granular and contains $U_3O_8$. Although the product formed at the high temperature process exhibits no deliquescence in contrast to the deliquescence of low-temperature material, the proposed high temperature process failed in continuous operation due to excess fines generation and poor particle control in the fluidized bed.

According to the Argonne process, the reduction of the uranyl fluoride to the oxide was carried out in a fluidized bed at a temperature in the range between 1100°F. and 1200°F. with a 50–50 mixture of steam and hydrogen for a period of four to seven hours. The product produced in the Argonne process, however, is not suitable for the fabrication of ceramic $UO_2$ pellets due to high fluoride content (above 150 ppm even after four to seven hours of treatment) and high nickel contamination due to the corrosion of the reaction vessel at a severe temperature and corrosive atmosphere.

SUMMARY OF THE INVENTION

I have discovered that uranium dioxide with extremely low fluoride content, i.e., 5 to 40 ppm (parts per million) and nickel contamination can be produced in a continuous multi-stage operation. Broadly stated, the process of this invention comprises introducing separately into a reaction zone having therein fluidized uranyl fluoride particles, steam and gaseous uranium hexafluoride, the latter at a rate and in a condition sufficient to prevent the formation of uranium fluoride solids prior to its reaction with the steam in the fluidized reaction zone. The concentration of the gaseous uranium hexafluoride and steam is regulated to promote a surface reaction on the fluidized particles while maintaining the temperature in the aforesaid range. Additional uranyl fluoride seed advantageously is added to the fluidized reaction zone to stabilize the average particle size therein and the excess uranyl fluoride is periodically or continuously removed therefrom.

Preferably an inert gas such as nitrogen and carbon dioxide is used as a diluent for the reaction. The diluent may be advantageously used to fluidize the bed either alone or in combination with the steam used for the hydrolysis. The gaseous diluent is also found to be suitable as a carrier for gaseous uranium hexafluoride.

The uranyl fluoride thus obtained is reacted in a second fluidized bed with a gaseous mixture of hydrogen and steam at a temperature in the range between 1100°F. and 1450°F. for a period sufficient to reduce a major portion of the fluoride. The defluorination conducted in the second fluidized bed is controlled by regulating the flow rate of the hydrogen-steam mixture fed into the fluidized bed and the ratio of $H_2/H_2O$ therein to provide a mixture with a low defluorination potential and a hydrogen concentration therein to below about 50 percent in excess of the stoichiometric requirement. The ratio of $H_2/H_2O$ of the gaseous mixture preferably is below about 30 percent. The product from the second fluidized bed is subjected to at least one additional defluorination treatment with a gas mixture having a $H_2/H_2O$ ratio higher than 30 percent and using a gaseous flow rate sufficient to produce uranium dioxide having a fluoride content less than about 100 ppm and preferably below 50 ppm. The defluorination in the additional treatment is in the range of 1100°F. to 1450°F.

The present invention is based on the discovery that continuous hydrolysis of uranium hexafluoride in a fluidized bed to form high density and non-hygroscopic uranyl fluoride can be carried out if (a) the temperature is carefully controlled to be within the range of 500°F. to 900°F. and preferably between 650°F. and 750°F., and (b) the introduction of the gaseous uranium hexafluoride is maintained at a sufficiently high velocity so that the transformation of $UF_6$ to other solid intermediate fluorides of uranium such as $UF_5$ does not occur prior to its reaction with the steam in the fluidized bed or the premature reaction of steam with $UF_6$ within the nozzle. The latter discovery is particularly significant because at temperatures above 500°F., transformation of $UF_6$ to crystalline uranium fluorides occurs at a rate sufficiently high as to cause plugging of the $UF_6$ inlet nozzle, unless the $UF_6$ inlet velocity is controlled.

The uranyl fluoride produced in the initial step of the process of this invention is significantly less hygroscopic. It has substantially uniform particle size of about +60 mesh, is free-flowing, has high bulk density and can be handled in atmosphere. The high density $UO_2F_2$ thus produced is particularly suitable for subsequent pyrolysis treatments to form $UO_2$ for reasons which will be apparent from the following description.

In addition, a major advantage in the initial step of the present invention over the prior art is the drastic reduction in the amount of fines recycle required to maintain the particle size stability. The recycle is less than about 10 percent by weight of the total fluidized bed and is generally in the range of 0 to 2 percent in order to stabilize a bed having 80 percent to 98 percent by weight of +60 mesh particles. As a comparison, in processes conducted at 446°F. the fines recycle was in the range of 14 to 24 percent by weight. A large fine recycle is undesirable partly because it represents nonproductive use of process capacity, but more importantly, the need for such a large amount of recycle indicates severe inherent process instability. Large recycle tends to perturb the steady-state conditions in the reaction, lowers the temperature in proportion to the weight of the recycle and threatens complete loss of control of process step.

The invention is also based on the discovery that the fluoride content in the uranium dioxide can be substantially reduced when a multi-stage, instead of a single stage, defluorination operation is used. Contrary to expectation, the total resident time of the uranium particles in the reaction zones is less and the combined hydrogen utilization efficiency is substantially higher in the multi-stage operation of this invention than in the prior one-step defluorination process. Another significant advantage of the present multi-stage defluorination operation is in its capability to produce, from the high density hydrolysis product, uranium dioxide particles with high internal stress and strain which can be subsequently milled with less energy than particles produced in the one-step operation. Not less important for commercial adaptation of this process is the fact that the multi-stage operation of this invention substantially eliminates the corrosion problems which contribute to high nickel contamination in the prior art process, even at operation temperatures (i.e., up to 1450°F.) higher than those heretofore used.

BRIEF DESCRIPTION OF THE DRAWING

FIGS. 1 and 2 combine to form a single flow sheet to illustrate the preferred process of this invention.

DESCRIPTION OF THE PREFERRED EMBODIMENTS

Figure 1:
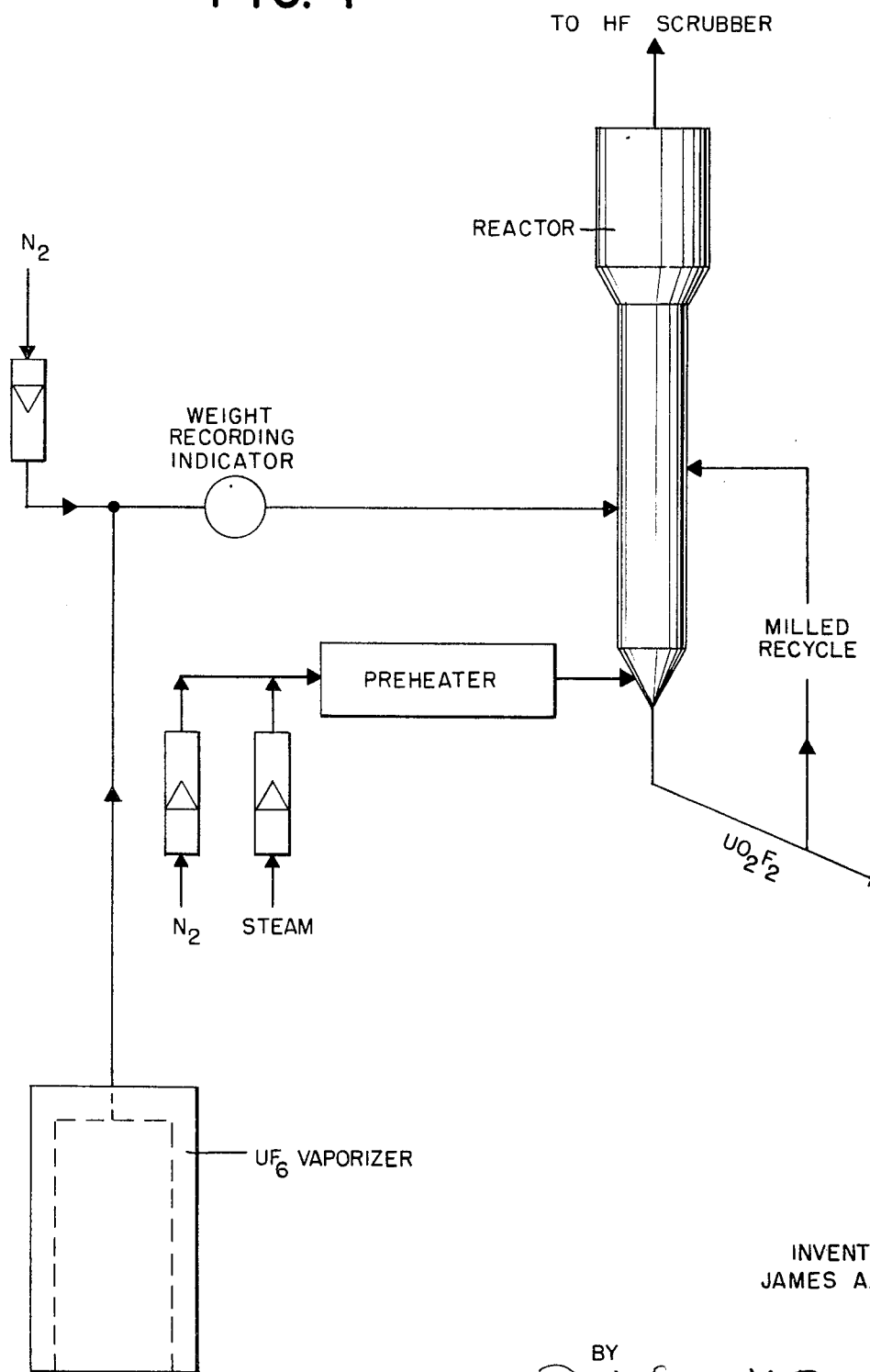
FIG. 1 illustrates a flow sheet for the hydrolysis of uranium hexafluoride to uranyl fluoride.

In the process of this invention, the chemical reaction of the initial step, the hydrolysis of uranium hexafluoride, may be represented by the following equation:

$UF_6(g) + 2H_2O(g) \rightarrow UO_2F_2(s) + 4HF(g);$ $\Delta H_{298c} = 26.8$ kcal/mole The exothermic reaction can be carried out over a wide temperature range. At temperatures below 500°F. the hydrolysis product is extremely hygroscopic. As the temperature of the reaction increases above 500°F., the deliquescent characteristic of the resultant uranyl fluoride diminishes. I found the tendency of $UO_2F_2$ to deposit on the walls of the reaction vessel is reduced to an acceptable level when the reaction is above 500°F. However, for the process of this invention I prefer to carry out the hydrolysis at a temperature in the range between 650°F. and 750°F. Within this temperature range the deposition problem is substantially eliminated. Furthermore, at this higher temperature range, the heat generated from the exothermic reaction is more usable and convenient to remove than the heat from the low temperature process.

For a continuous hydrolysis operation in a fluidized bed, it is essential that the concentrations of the reactants in the fluidized bed are such that, at the preferred temperature range, the reaction is predominantly a coating type or surface induced reaction. With this type of reaction, the uranyl fluoride from the hydrolysis is produced in the form of a coating on the $UO_2F_2$ seed in the fluidized bed. Attrition of the large particles of fines generated by a minor vapor-phase operation produces additional seed or surface area for the reaction to replace the surface area that is lost by particle growth and by the particles removed from the bed. At the optimal operation condition, the seed generation and particle growth should be balanced to provide a stabilized fluidized bed operation with little or no addition of seeds into the fluidized bed.

I have found that a stable operation can be maintained in the preferred temperature range when the amount of steam used is above the stoichiometric requirement for the hydrolysis but is not in excess of 300 percent. The amount of steam to be used in the reaction depends also on the amount of gaseous diluent in the reaction zone. Generally, a satisfactory operation condition can be obtained with less than 200 percent of excess steam when the amount of gaseous diluent is in the range of 0 to 50 percent of total gas volume in the fluidized bed.

The use of inert gaseous diluent such as nitrogen or carbon dioxide is essential for the successful operation of this invention when the capacity of the equipment inherently limits a high feed rate of $UF_6$ into the fluidized bed. At the reaction temperature of above 500°F., the gaseous $UF_6$ has a tendency to transform into crystalline lower fluorides such as $UF_5$ before it can react with steam, thus plugging the inlet $UF_6$ nozzle. To avoid plugging, a high gas flow rate must be used. I found a minimum flow rate of 5000 cfh per sq. in. of nozzle opening (36 cfh for a 3/32 in. diameter nozzle) is required in order to have a plugging free operation. Since the coating reaction is dependent on the concentrations of the reactants and the minimum resident time of $UF_6$ in the reactor, a high flow rate oftentime cannot be used with an average capacity fluidized bed reactor. By using an inert diluent, however, the amount of $UF_6$ introduced into the reactor can be reduced without limiting the nozzle velocity of the feed.

As shown in FIG. 1, the $UF_6$ gas from the vaporizer which may be premixed with $N_2$ is fed into the lower part of the fluidized bed of uranyl fluoride particles after passing through the weight recording indicator. The temperature of $UF_6$ or its admixture with nitrogen should be above the crystallization temperature of $UF_6$ at the pressure used to inject the feed into the fluidized bed. Generally, a temperature in the range of 200°F. to 300°F. is suitable. The pressure required to inject the gaseous mixture into the fluidized bed at the minimum nozzle velocity depends on the nozzle design and other variables. I have found a pressure in the range of 5 to 15 psi to be sufficient for achieving the minimum nozzle velocity.

The steam may be separately introduced into the fluidized bed reactor. Advantageously, steam alone or in combination with $N_2$ is used to fluidize the bed of $UO_2F_2$ particles. The steam or the mixture of steam and $N_2$ is preheated to a temperature in the range of 500°F. to 700°F. and then is fed into the bottom of the column to fluidize the bed of $UO_2F_2$ particles. Depending on the height of the fluidized bed, a pressure in the range of 5 to 10 psi is normally sufficient for this purpose.

In starting the hydrolysis operation, a bed of $UO_2F_2$ particles having a particle size in the range of −60 to +100 mesh is initially heated to the operational temperature by external heating coils. After the operational temperature has been achieved, steam is initially fed into the reactor for a period of about 10 minutes to an hour and thereafter the $UF_6$ gas mixture is introduced into the reactor to react with the steam. Since the hydrolysis is exothermic, the reactor temperature may be maintained by using external cooling means. For a large reactor, the loss of heat from its surface may be sufficient to avoid external cooling coils.

At the beginning of this operation, the $UO_2F_2$ particles are withdrawn periodically to maintain a proper bed height. A portion of these $UO_2F_2$ particles is recycled initially for the purpose of stabilizing the particle size to within the range of 30 to 60 mesh. After the average particle size of $UO_2F_2$ in the fluidized bed reaches the desired particle size, the product is removed periodically or continuously for further processing to produce $UO_2$ by pyrohydrolysis according to the procedure to be described hereinbelow.

To avoid excess growth of the $UO_2F_2$ particles to above 30 mesh, a certain amount of uranyl fluoride particles may be advantageously milled to a particle size in the range of $-60$ to $+100$ mesh to serve as seed in the fluidized bed when the generation of fine is not sufficient for the stabilization of particle size. Generally I found a recycle rate after stabilization is attained of less than 10 percent by weight of the bed and can be controlled to below about 2 percent.

The fluidized bed reactor is equipped at the uppermost portion with filters which are used to entrap the fines carried up by the off-gas. A periodic blowback of the filter is used for cleaning and the fines falling back to the bed serve as additional seed. The off-gas containing steam, nitrogen and HF is sent to an HF scrubber wherein the HF gas is recovered as hydrofluoric acid.

According to the present invention, uranyl fluoride produced by hydrolysis of $UF_6$ is defluorinated by pyrohydrolysis with hydrogen and steam in a multi-stage operation. The exact mechanism of the reduction is not yet certain. The defluorination may follow the first or both modes of reactions represented by the following equations:

(I) $UO_2F_2(s) + H_2O(g) \rightarrow \frac{1}{3}U_3O_8(s) + 2HF(g) + 1/6 O_2$ $\frac{1}{3}U_3O_8(s) + \frac{2}{3}H_2(g) \rightarrow UO_2(s) + \frac{2}{3}H_2O(g)$ and (II) $UO_2F_2(s) + H_2(g) \rightarrow UO_2(s) + 2HF(g)$ In the prior Argonne study (referred to hereinabove), the fluoride removal was found to be incomplete and slow when hydrogen alone was used to reduce uranyl fluoride, due possibly to the formation of $UF_4$ according to the following reversable reaction:

$UF_4(s) + 2H_2O(g) \rightleftarrows UO_2(s) + 4HF(g)$.

In the same study it was found that a 50—50 mixture of hydrogen and steam provides the optimal rate for defluorination.

In the multi-stage defluorination of $UO_2F_2$ according to the present invention, a fast defluorination rate in the first defluorination step is detrimental to the success of the present process because of the generation of excess fines which, as stated hereinabove, would prevent the continuous operation of the fluidized bed reactor. As stated above, the high density uranyl fluoride particles are produced in the hydrolysis operation essentially by a coating type of process; hence, these particles have an onion-like internal structure. In pyrohydrolysis, $UO_2F_2$ particles when first coming into contact with hydrogen and steam react with them rapidly. The reaction rate, however, decreases after the first layer is converted to the oxide form at which time the reaction rate is dependent to a large extent on the diffusion rate of the gaseous reactants in the particles. In the transformation of $UO_2F_2$ to the final oxide form internal stress and strain are imparted into the particles due to phase transformation $UO_2F_2$ to $UO_2$ and density differential between these two compounds. The fine generation is caused by excess buildup of internal stress and strain resulting from a high defluorination rate at the beginning of the hydrolysis.

Defluorination of $UO_2F_2$ at a high rate is also not desirable because it causes an excess retention of HF in the reaction zone. A high concentration of HF favors the formation of $UF_4$ and hinders the complete conversion of $UO_2F_2$ according to the equation:

$UO_2 + 4HF \rightleftarrows 2H_2O + UF_4$

A high concentration of HF at the reaction temperature also causes higher corrosion rate of the reactor vessel, thus introducing a larger amount of contamination.

The internal stress and strain, however, may be advantageously utilized if they can be retained within the $UO_2$ particles without causing attrition or breaking up of these particles. I found the internal stress and strain may be retained within the particles when the defluorination rate is controlled. The retained stress and strain in the $UO_2$ particles can be subsequently milled with less energy. A saving of milling energy up to about 40 percent to 50 percent may be attained in fluid mill with $UO_2$ particles produced according to the process of this invention as compared to similar $UO_2$ particles prepared without the retained stress and strain.

The controlled defluorination in the first step of pyrohydrolysis is achieved by using a hydrogen and steam mixture with relatively low defluorination potential which comprises less than about 30 percent of $H_2$ by volume and preferably in the range between 20 percent to 25 percent to defluorinate uranyl fluoride in a fluidized bed. The gaseous mixture should be fed into the bed at a rate sufficient to provide an equivalent amount of resident $H_2$ in the fluidized bed slightly in excess of the stoichiometric requirement (based on equation (I) presented hereinabove). Preferably the excess $H_2$ in the bed is less than about 50 percent. Using this gaseous composition and with the rate stated above, I found a major portion of fluoride (in excess of 80%) can be reduced in a relatively short period of time at a temperature in the range of 1100°F. to 1450°F. The partially defluorinated particles thus produced have retained stress and strain and when properly reduced in subsequent defluorination operations, possess excellent milling characteristics.

Figure 2:
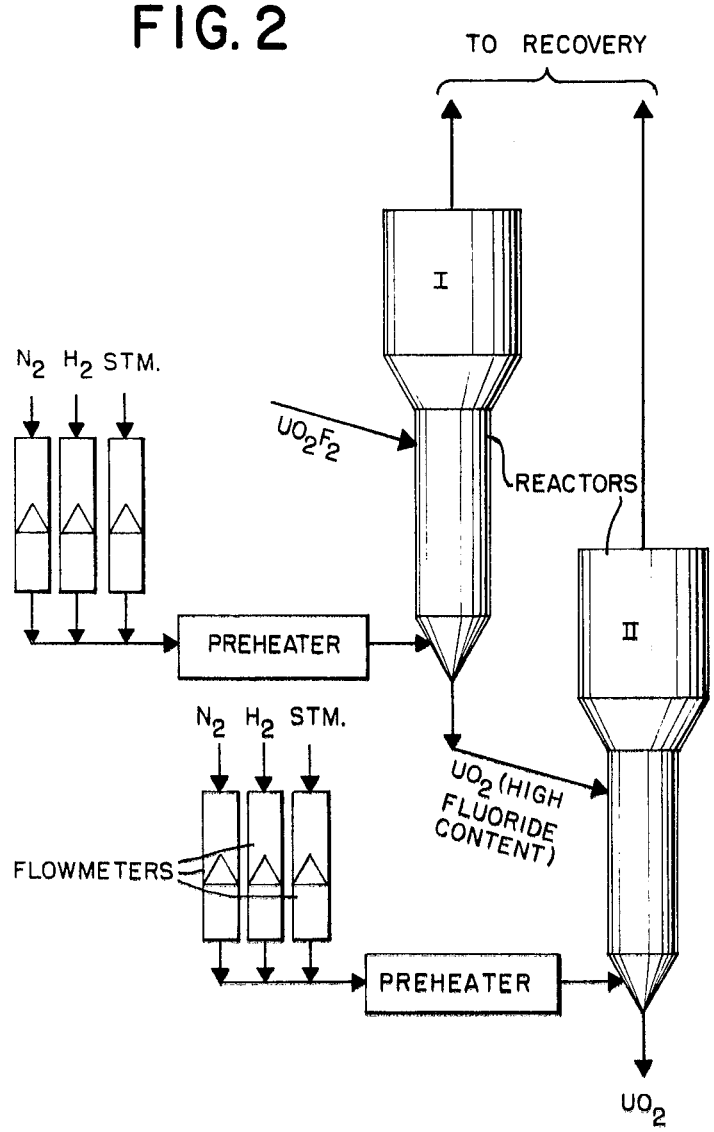
FIG. 2 shows a flow sheet for the multi-stage defluorination operation.

Further to describe the multi-stage defluorination of this invention reference is now made to FIG. 2.

As shown therein, $UO_2F_2$ from the hydrolysis reactor (shown in FIG. 1) is fed either continuously or intermittently into the first of the two defluorination fluid bed reactors which are constructed in the same manner as the hydrolysis reactor with each having a bottom gas distribution section, a cylindrical main fluidizing section and an upper gas disengaging section. Due to severe operation conditions, these reactors are fabricated, preferably with materials having high resistance to corrosive hydrofluoric acid at extremely elevated temperatures. Alloys such as Inconel may be advantageously used. The fluidized reactors are equipped with external heaters (not shown) for heating or maintaining the reaction at the proper temperature range of 1100°F. to 1450°F.

The uranyl fluoride particles are fed into the fluidized bed reactor through a feed port located at the fluidizing section of the reactor wherein a bed of $UO_2$ particles is fluidized by steam and hydrogen entering from the bottom gas distribution section. Both the steam and hydrogen may be from standard commercial sources. Preferably these gases are preheated to a temperature above 500°F. prior to their introduction into the bottom portion of the reactor. Flow meters are used to control their respective flow rates and the ratio of $H_2$ and $H_2O$ used for the defluorination.

Advantageously, a source of $N_2$ may be connected to the bottom section of the reactor. The nitrogen is used to start up the reactor and as a diluent for the steam and hydrogen mixture to control the reaction rate during the operation of the reactor. Usually I found that the use of a diluent is not needed once the fluidized bed is stabilized.

As stated hereinabove, the success of the present process is dependent to a large extent on contolling the defluorination rate of the uranyl fluoride. At the defluorination temperature in the range between 1100°F. and 1450°F., the hydrogen-steam gaseous mixture stated above provides a moderate defluorination rate when the $H_2$ in the fluidized zone is not substantially above the stoichiometric requirement. Usually, the amount of excess hydrogen should not be more than 30 percent and preferably not above 20 percent. By deliberately limiting the defluorination potential of the hydrogen and steam, the reduction of $UO_2F_2$ is sufficiently slow so that the fragmentation of the particles is limited to a tolerable extent. The unfragmented particles retain the stress and strain which after subsequent defluorination treatment can be milled with less energy.

Even by limiting the reduction rate I found the defluorination proceeds rapidly. The uranium particles generally have a resident time less than about three hours and generally about one hour before the fluoride content therein is lower than about 2 percent. In this first stage of defluorination, the temperature is preferably maintained at the upper limit of the temperature range, i.e., 1300°F. to 1400°F.

The uranium dioxide from the first defluorination reactor (I) is withdrawn therefrom either continuously or intermittently through a product exit port which may be located in the bottom section or at the mid section of the reactor. The latter arrangement collects the overflow as the product. The percentage of the fluoride converted to the oxide form in the product is dependent on the resident time of the feed and the reaction conditions. The product may contain a higher percentage of fluoride when more than two stages are used for the defluorination. In such instance, the intermediate stage or stages may be used to reduce the fluoride with a gas mixture with gradually increasing defluorination potential. When a two-stage process is used, however, the amount of fluoride retained in the first stage product should be sufficient so that a gas mixture with a high deflyorination potential may be used in the latter stage without causing fragmentation or excess HF concentration. From my experiments, a fluoride content of 3000 ppm in the first stage product is preferred.

The first stage product is further defluorinated in a second fluidized bed reactor (II) in substantially the same manner as in the first defluorination reactor. Since a major portion of the fluoride has been reduced, the concentration of $H_2$ in the hydrogen and steam mixture in the second defluorination reactor is enriched and the flow rate of the reaction gases is increased to insure a substantially complete defluorination. I found the $H_2$ content in the reaction gaseous mixture which provides optimal results is in the range between 30 to 50 percent. The flow rate of these gases, however, should be such that the excess $H_2$ is below about 100 percent of the stoichiometric requirement. The defluorination in the second stage should be in about the same temperature range as for the first stage. Defluorination of $UO_2$ to below 50 ppm of fluoride at these reaction conditions generally requires less than about three hours and usually about one hour of $UO_2$ resident time in the reactor.

As shown in FIG. 2, the off-gases from both reactors which contain HF, unreacted $H_2$ and steam, as well as entrained fines, are treated to recover the HF as hydrofluoric acid and the fines for recycling as seeds for the hydrolysis reactor.

Instead of $UO_2F_2$ as the starting material for the defluorination, $UF_4$ may be used. When uranium tetrafluoride is used, the defluorination proceeds substantially in the same manner as described. The defluorination temperature should be slightly lower in the initial defluorination stage to avoid possible sintering of $UF_4$.

The $UO_2$ produced according to the process of this invention can be fluid-milled to active oxide for the production of ceramic grade $UO_2$ pellets.

Further to illustrate this invention, a specific example is described hereinbelow. In this example all three fluidized bed reactors were similarly constructed. They are fabricated from Inconel cylinders having an interior diameter of about four inches and equipped with two filters at the uppermost portion. The fluidizing section of these reactors is about 6½ feet long. In the hydrolysis operation, the $UF_6$ feeds were mixed with 25 to 50 percent by volume of $N_2$. The temperature of the feeds was 230°F. The steam used for the reaction and the fluidization was also premixed with about 25 percent by volume of $N_2$ and the mixture was preheated to 600°F. before feeding into the reactor.

EXAMPLE

In the first run the reactor was loaded with a 35 pound charge of 80 percent +60 mesh $UO_2F_2$, 17 percent +100 and 3 percent +200 mesh which was maintained at 700°F. The $UF_6$ flow rate was stabilized at 11 to 13 pounds per hour. During the first five hours of the run, the +200 fraction increased to 41 percent of total bed weight. The high increase in the +200 was in all probability caused by a recycle of 1.0 pound per hour. When the recycle rate was reduced to 1.0 pound per every two hours to reduce the growth of +200, the +60 fraction increased to 89 percent five hours after changing recycle rate. At this time the bed contained 10.6 percent +100 mesh and 0.4 percent +200 mesh $UO_2F_2$. The +60 fraction was allowed to increase to 96 percent before particle growth was stabilized. The +60 fraction was maintained at 96 percent for approximately six hours.

The second was an extended 55 hour run which was made utilizing the information derived in the previous run. The reactor was operated continuously with normal filter, reactor and diffuser plate pressure throughout the run. A $UF_6$ flow rate of 11 pounds per hour was maintained. After approximately eight hours of operation the particle size had stabilized with the product analyzing 97.5 percent +60 and 2.5 percent +100. A recycle rate of 0.5 to 1.0 pound of −60 $UO_2F_2$ recycled every two hours was used to hold the +60 fraction to 95 to 97 percent. Because of the rapid growth of +30 mesh particles from +60, fluidization becomes difficult when the +60 fraction exceeds 97 percent of total bed weight, consequently, −60 mesh $UO_2F_2$ was recycled specifically to slow down the growth of +30 mesh particles. After 55 hours of operation, the product analyzed 96 percent +60, 3.5 percent +100 and 0.3 percent +200.

In the third run the reactor was charged with 35 pounds of $UO_2F_2$, 80 percent +60, 16 percent +100 and 4 percent +200. Observations during previous runs had shown that fluidization was easily affected when the bed contained some fine particles at start-up.

The object of the run was to demonstrate particle size control over extended periods of operation utilizing the information learned in the previous run with variations in the $UF_6$ flow up to 25 pounds per hour. The $UF_6$ flow was started and stabilized at 19 pounds per hour for approximately two hours; it was then increased to 25 pounds per hour.

During the first two to three hours of the run, the +60 fraction increased to 96.5 percent with a corresponding decrease of fines to 3.2 percent +100 and 0.3 percent +200. The recycle rate was increased to 0.75 pound every 2 hours when screen analyses showed 15 percent +30 mesh $UO_2F_2$ in the bed, which was used to limit the +30 particles.

At the end of the run, screen analyses showed 97.8 percent +60, 2.2 percent +100 and 0.3 percent +200.

The uranyl fluoride produced in these runs are used to prepare $UO_2$. The first reactor was preheated to 1300°F. before the 45 pounds of $UO_2F_2$ was fed thereinto through the feed port. Nitrogen was introduced into the bed to maintain fluidization until the reaction temperature of 1300°F. was reached. At this point, steam and hydrogen flows were started and the nitrogen was shut off. Steam and hydrogen at a ratio of three parts steam to one part hydrogen were used, both to reduce the uranyl fluoride and to fluidize the bed. In the first reactor the $UO_2F_2$ was reduced to $UO_2$ with a fluoride content in the range of 3500 to 2500 parts per million with an average bed resident time of three hours per 45 pounds of uranyl fluoride.

The original 45 pound bed of uranyl fluoride was reduced for three hours prior to the beginning of additions of 20 pound batches of $UO_2F_2$ or removal of $UO_2$.

The uranyl fluoride used throughout the process was in the particle size range of −30 to +100 mesh; 85 percent of which was −60 +100 mesh. After three hours of pyrohydrolysis, the average fluoride level was reduced to 1000 to 5000 ppm and cyclical operation was initiated. Regular withdrawals of 17.5 pounds of $UO_2$ were followed by charging in 20 pound increments to maintain a bed of 40 pounds of $UO_2$.

The hydrogen flow of only 20 percent in excess of stoichiometric requirements was deliberately used to limit the rate of fluoride removal and thereby limit the HF concentration in the stack gas which could cause conversion of $UO_2$ to $UF_4$ and minimize the fluoride concentration gradients within the particles (large fluoride gradients result in density gradients which in turn produces a fragile particle and excessive attrition during fluidization). The process removed 98 percent of the fluoride. Process parameters are defined in the attached table under runs 1 and 2.

The second step pyrohydrolysis of the product from runs 1 and 2 was initiated with drastically increased gas flows to assure adequate fluoride removal (Run 2.1) using a gas mixture containing 40% $H_2$. Excessive attrition and solids entrainment in the gas stream resulted. Since only trace levels of fluoride were present in the feed, the steam flow was reduced with no hazard of hydrofluorination of the $UO_2$. In spite of the higher hydrogen concentration, the total hydrogen consumption was held to 100 percent excess for run 2.2 with a fluoride level of <10 ppm.

The product was micronized and blended producing a finely divided $UO_2$ analyzing 42 percent <1.4μ by sedimentation and 0.65μ by Fisher sub-sieve size analysis. The oxide was agglomerated with PVA, pressed and sintered to produce sound, specification density pellets.

TABLE I

| Run No. | Feed product | Charge Bed wt., lbs. | Charge Frequency Cycle/hr. | Charge Lbs. | Withdrawal Frequency Cycle/hr. | Withdrawal Lbs. | Temperature, degrees F. Max. | Temperature, degrees F. Min. | Gas flow. s.c.h.f. $N_2$ | Gas flow. s.c.h.f. $H_2$ | Gas flow. s.c.h.f. $H_2O$ | Pass No. | Fluoride average, p.p.m. | Produce particle size |
|---|---|---|---|---|---|---|---|---|---|---|---|---|---|---|
| 1 | $UO_2F_2$ | 45 | 1 | 20 | 1 | 17.5 | 1,300 | 1,250 | 4 | 30 | 90 | 1 | >1,000 | −60 +100 |
| 2 | $UO_2F_2$ | 45 | 1 | 20 | 1 | 17.5 | 1,300 | 1,250 | 8 | 30 | 66 | 1 | >1,000 | −60 +100 |
| 2.1 | $UO_2$ | 45 | 1 | 20 | 1 | 19.4 | 1,400 | 1,350 | 8 | 110 | 82.5 | 2 | 25 | (>10% −200M) |
| 2.2 | $UO_2$ | 35–40 | 1 | 35–40 | 1 | 35 | 1,400 | 1,350 | 8 | 40 | 49.5 | 2 | <10 | +100 −200 |

Run 2.1—$UO_2$ broke up during second step of pyrohydrolysis and was blown over to the cyclone as a result of very high gas flows.
Run 2.2—Represents ideal conditions for second step of pyrohydrolysis.

$UO_2$ analysis:

| | | | |
|---|---|---|---|
| $H_2O$—0.16% | Cr—31 p.p.m. | Si—22 | P—<5 |
| $U^{+6}$—3.40% | CU—<10 p.p.m. | Sm—<1 | Fe—81 p.p.m. |
| Ag—0.2 p.p.m. | Dy—<.1 | Sn—<5 | Ni—70 p.p.m. |
| Al—<20 p.p.m. | Eu—<.1 | V—<5 | N—14 p.p.m. |
| B—<0.25 p.p.m. | Gd—<.1 | W—<20 | Cl—<10 p.p.m. |
| C—117 p.p.m. | Mg—<13 | Ba—<5 | U assay—87.67% |
| Ca—15 p.p.m. | Mn—<5 | Be—<0.5 | |
| Cd—<0.25 | Mo—<10 | Zr—8 | |
| Co—2 | Pb—<1 | Zn—<10 | |

Summary of run data.

I claim:

1. A process for the conversion or uranium hexafluoride by hydrolysis first to uranyl fluoride and then to uranium dioxide which comprises:
   introducing steam and gaseous uranium hexafluoride separately into a first reaction zone having therein a fluidized bed of uranyl fluoride particles maintained at a reaction temperature of at least about 500°F., said uranium hexafluoride being introduced into said first reaction zone in the form of a gas or a gaseous mixture at a temperature of at least 200°F. and at a rate of at least about 5000 cfh per square inch of nozzle opening to prevent the formation of uranium fluoride solids prior to its reaction with the steam in the fluidized reaction zone:

regulating the relative concentration of the gaseous uranium hexafluoride and steam in said first reaction zone so that the amount of steam is greater than but does not exceed three times the amount theoretically required for the hydrolysis reaction, while maintaining the temperature therein above 500°F. but below 900°F. to promote a surface reaction on the fluidized uranyl fluoride particles;

maintaining sufficient uranyl fluoride seed particles in the reaction zone to stabilize the average particle size therein at a level such that at least about 80 percent of the particles are larger than +60 mesh (Tyler standard)

removing excess uranyl fluoride particles from the reaction zone;

reacting the excess uranyl fluoride particles in a second reaction zone with a hydrogen and steam mixture at a temperature between 1100°F. and 1450°F. to remove at least 80 percent of the fluoride in the uranyl fluoride, the amount of hydrogen used being lower than 50 percent above the stoichiometric requirement and the ratio of hydrogen and steam in the gaseous mixture being in the range between 0.20 to 0.30;

subjection the defluorinated uranyl fluoride to at least one more defluorination treatment with a gaseous mixture of hydrogen and steam having a ratio of $H_2/H_2O$ higher than the mixture used in the second reaction zone but below about 0.60 in an amount sufficient to provide hydrogen more than 50 percent above the stoichiometric requirement, at a temperature in the range between 1100°F. and 1450°F. and for a period sufficient to produce uranium dioxide with a fluoride content below about 100 ppm and recovering the uranium dioxide therefrom.

2. A process according to claim 1 wherein the hydrolysis of uranium hexafluoride in the first reaction zone is carried out in the presence of an inert gaseous diluent.

3. A process according to claim 2 wherein the diluent is nitrogen.

4. A process according to claim 1 wherein the temperature in the first reaction zone is maintained in the range between 650°F. and 750°F.

5. A process according to claim 1 wherein the gaseous uranium hexafluoride is premixed with not more than about 50 percent by volume of $N_2$.

6. A process according to claim 1 wherein the particle size of uranyl fluoride in the first reaction zone is stabilized to within the range of 80 percent to 98 percent by weight of +60 mesh by recycling less than 15% by weight of the total fluidized bed of $UO_2F_2$ seed having particle size in the range between −60 and +100 mesh.

7. A process according to claim 1 wherein the defluorination of uranyl fluoride in the second reaction zone is carried out in a fluidized bed.

8. A process according to claim 1 wherein the defluorination of the uranyl fluoride is carried out successively in at least two separate fluidized beds.

9. A process according to claim 1 wherein the defluorination in the second reaction zone uses a 0.30 hydrogen and steam mixture and the subsequent defluorination treatment is carried out using a 0.40 hydrogen and steam mixture.

10. A process according to claim 1 wherein at least a portion of the excess uranyl fluoride is recovered as a secondary product of the process.

* * * * *